(12) United States Patent
Panguluri

(10) Patent No.: US 11,151,189 B2
(45) Date of Patent: *Oct. 19, 2021

(54) RETRIEVING AND PLAYING OUT MEDIA CONTENT FOR A PERSONALIZED PLAYLIST INCLUDING A CONTENT PLACEHOLDER

(71) Applicant: Gracenote Digital Ventures, LLC, New York, NY (US)

(72) Inventor: Venkatarama Anilkumar Panguluri, Milpitas, CA (US)

(73) Assignee: Gracenote Digital Ventures, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,879

(22) Filed: Feb. 11, 2020

(65) Prior Publication Data

US 2020/0175060 A1 Jun. 4, 2020

Related U.S. Application Data

(63) Continuation of application No. 14/280,337, filed on May 16, 2014, now Pat. No. 10,599,705.

(Continued)

(51) Int. Cl.
*G06F 16/438* (2019.01)

(52) U.S. Cl.
CPC ................ *G06F 16/4387* (2019.01)

(58) Field of Classification Search
CPC ................................... G06F 16/4387

(Continued)

(56) References Cited

U.S. PATENT DOCUMENTS 6,513,043 B1 * 1/2003 Chan ............... G06F 16/284
707/802
6,587,127 B1 * 7/2003 Leeke ............... G06F 3/165
715/765

(Continued)

FOREIGN PATENT DOCUMENTS

KR 1020100000249 A 1/2010
KR 1020110117496 A 10/2011

(Continued)

OTHER PUBLICATIONS

Printout of website relating to "Stitcher Radio for Podcasts" app, printed Mar. 4, 2014, 4 pages.

(Continued)

*Primary Examiner* — Ashish Thomas
*Assistant Examiner* — Nargis Sultana
(74) *Attorney, Agent, or Firm* — McDonnell Boehnen Hulbert & Berghoff LLP

(57) ABSTRACT

An example method involves receiving a playlist defining a sequence of media content items including first and second content items; retrieving first data representing the content items, and using the retrieved first data to play out the content items in accordance with the sequence; making a first determination of whether the playlist defines a placeholder between the first and second content items; responsive to the first determination being that the playlist defines a placeholder, making a second determination of whether a condition has been satisfied, wherein the condition corresponds to a content category type; and responsive to the second determination being that the condition has been satisfied, (i) retrieving second data representing a media content item of the content category type, and (ii) using the retrieved second data to play out the content item in between playing out the first and second content items.

20 Claims, 7 Drawing Sheets

Related U.S. Application Data

(60) Provisional application No. 61/968,183, filed on Mar. 20, 2014.

(58) Field of Classification Search
USPC .......................................................... 707/803
See application file for complete search history.

(56) References Cited

U.S. PATENT DOCUMENTS

| | | | |
|---|---|---|---|
| 7,689,705 | B1 | 3/2010 | Lester et al. |
| 8,359,382 | B1* | 1/2013 | Gailloux ................. H04L 65/60 709/223 |
| 8,875,184 | B1 | 10/2014 | Bakare et al. |
| 9,319,461 | B2 | 4/2016 | Perkuhn et al. |
| 9,798,509 | B2 | 10/2017 | Panguluri et al. |
| 10,362,094 | B2 | 7/2019 | Pangulur |
| 10,599,705 | B2 | 3/2020 | Pangulur |
| 10,599,706 | B2 | 3/2020 | Pangulur |
| 10,757,159 | B2 | 8/2020 | Pangulur et al. |
| 10,764,358 | B2 | 9/2020 | Pangulur |
| 2001/0053944 | A1 | 12/2001 | Marks et al. |
| 2002/0049974 | A1 | 4/2002 | Shnier |
| 2002/0053078 | A1 | 5/2002 | Holtz et al. |
| 2002/0188748 | A1 | 12/2002 | Blackwell et al. |
| 2003/0023638 | A1 | 1/2003 | Weight |
| 2003/0028505 | A1* | 2/2003 | O'Rourke ........... H04L 65/4084 |
| 2003/0093794 | A1 | 5/2003 | Thomas et al. |
| 2003/0130894 | A1 | 7/2003 | Huettner et al. |
| 2003/0182315 | A1 | 9/2003 | Plastina et al. |
| 2004/0163115 | A1 | 8/2004 | Butzer |
| 2004/0199387 | A1 | 10/2004 | Wang et al. |
| 2005/0267973 | A1 | 12/2005 | Carlson et al. |
| 2006/0047701 | A1 | 3/2006 | Maybury et al. |
| 2007/0256021 | A1* | 11/2007 | Prager ..................... H04L 67/02 715/744 |
| 2007/0279247 | A1 | 12/2007 | Rye et al. |
| 2007/0282898 | A1* | 12/2007 | Stark ............... H04N 21/26258 |
| 2008/0016081 | A1 | 1/2008 | MacMillan et al. |
| 2008/0033990 | A1 | 2/2008 | Hutson et al. |
| 2008/0040212 | A1 | 2/2008 | Grouf et al. |
| 2008/0293393 | A1 | 11/2008 | Hartmaier |
| 2009/0124193 | A1 | 5/2009 | Mitzel et al. |
| 2009/0157731 | A1* | 6/2009 | Zigler ................... G06F 16/686 |
| 2009/0302108 | A1 | 12/2009 | Patrick et al. |
| 2009/0313303 | A1* | 12/2009 | Spence ............... G06F 16/4387 |
| 2009/0313432 | A1* | 12/2009 | Spence ................ G11B 27/105 711/115 |
| 2010/0010648 | A1 | 1/2010 | Bull et al. |
| 2010/0057928 | A1* | 3/2010 | Kapoor ............... G06F 16/4387 709/231 |
| 2010/0064053 | A1 | 3/2010 | Bull et al. |
| 2010/0095333 | A1 | 4/2010 | Kelly et al. |
| 2010/0162330 | A1 | 6/2010 | Herlein et al. |
| 2010/0241963 | A1* | 9/2010 | Kulis ..................... G06F 16/685 715/727 |
| 2010/0275221 | A1 | 10/2010 | DuVall et al. |
| 2011/0035705 | A1 | 2/2011 | Faenger et al. |
| 2011/0040718 | A1 | 2/2011 | Tendjoukian et al. |
| 2011/0069936 | A1 | 3/2011 | Johnson et al. |
| 2011/0131180 | A1 | 6/2011 | Tuli et al. |
| 2011/0145370 | A1* | 6/2011 | Nieuwenhuys .... H04N 21/2668 709/219 |
| 2011/0167390 | A1 | 7/2011 | Reed, Jr. et al. |
| 2011/0239253 | A1 | 9/2011 | West et al. |
| 2011/0252118 | A1 | 10/2011 | Pantos et al. |
| 2011/0295669 | A1* | 12/2011 | Stiebel ................... G06Q 30/02 705/14.19 |
| 2012/0066186 | A1 | 3/2012 | Wohlert |
| 2012/0245982 | A1* | 9/2012 | Daniel .................. G06F 16/438 705/14.4 |
| 2012/0254755 | A1 | 10/2012 | Wohlert |
| 2012/0259727 | A1 | 10/2012 | Fermin et al. |
| 2012/0290932 | A1 | 11/2012 | Johnson |
| 2012/0331106 | A1 | 12/2012 | Ramamurthy et al. |
| 2013/0081083 | A1 | 3/2013 | Yu et al. |
| 2013/0178962 | A1 | 7/2013 | DiMaria et al. |
| 2013/0179275 | A1 | 7/2013 | Harb |
| 2013/0304822 | A1* | 11/2013 | Tetreault ............ H04N 21/2187 709/204 |
| 2013/0332532 | A1* | 12/2013 | Bernhardsson ......... G06F 16/48 709/204 |
| 2014/0068662 | A1* | 3/2014 | Kumar .................. H04N 21/812 725/34 |
| 2014/0074813 | A1 | 3/2014 | Franks et al. |
| 2014/0136554 | A1 | 5/2014 | Moradi et al. |
| 2014/0208206 | A1 | 7/2014 | Scott et al. |
| 2014/0258292 | A1* | 9/2014 | Thramann ............... G06F 16/48 707/736 |
| 2015/0074191 | A1 | 3/2015 | Feng et al. |
| 2015/0106841 | A1 | 4/2015 | Wolf et al. |
| 2015/0296258 | A1 | 10/2015 | Morten |
| 2016/0065637 | A1* | 3/2016 | O'Malley ............... H04L 67/22 709/231 |
| 2018/0197158 | A1* | 7/2018 | Smalley ............. G06Q 30/0623 |

FOREIGN PATENT DOCUMENTS

| | | |
|---|---|---|
| KR | 1020140014664 A | 2/2014 |
| WO | 2013013176 A1 | 1/2013 |

OTHER PUBLICATIONS

Printout of website relating to "Rivet News Radio" app, printed Mar. 4, 2014, 2 pages.

Printout of website relating to "Swell Radio for News and Podcasts" app, printed Mar. 4, 2014, 3 pages.

Printout of website relating to "Swell FAQs", printed Mar. 4, 2014, 6 pages.

Melissa Harris, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013.

U.S. Appl. No. 14/280,350, filed May 16, 2014.

U.S. Appl. No. 14/341,503, filed Jul. 25, 2014.

International Search Report and Written Opinion dated Mar. 17, 2015, issued in connection with International Patent Application No. PCT/US2014/072825, filed on Dec. 30, 2014.

Non-final office action dated Jul. 21, 2016 of U.S. Appl. No. 14/280,350, filed May 16, 2014.

International Search Report and Written Opinion dated Apr. 7, 2015, issued in connection with International Patent Application No. PCT/US2014/072817.

Non-final office action dated Oct. 24, 2016 of U.S. Appl. No. 14/341,503, filed Jul. 25, 2014.

Non Final Office Action for U.S. Appl. No. 14/280,350 dated Nov. 15, 2017.

Final office action dated Apr. 20, 2017 of U.S. Appl. No. 14/341,503, filed Jul. 25, 2014.

Search and Examination Report of Australian Patent Application No. 2014401801, dated Oct. 18, 2017.

Australian Government, IP Australia, Notice of Acceptance for Patent Application dated Jan. 10, 2018, issued in connection with Australian Application No. 2014401801, 3 pages.

Extended European Search Report, European Patent Application No. 14898132.7, dated Mar. 2, 2018, 9 pages.

Non-Final Office Action dated Apr. 20, 2018 for U.S. Appl. No. 14/341,503.

Final Office Action dated Jun. 12, 2018 for U.S. Appl. No. 14/280,350.

Final Office Action dated Oct. 17, 2018 for U.S. Appl. No. 14/341,503.

Non-Final Office Action dated Mar. 6, 2019 for U.S. Appl. No. 14/341,503.

Notice of Allowance for U.S. Appl. No. 14/341,503 dated Apr. 19, 2019.

Non Final Office Action for U.S. Appl. No. 14/280,350 dated May 8, 2019.

(56) References Cited

OTHER PUBLICATIONS

Advisory Action for U.S. Appl. No. 14/280,350 dated Sep. 25, 2018.
International Search Report and Written Opinion dated Mar. 24, 2015, issued in connection with International Patent Application No. PCT/US2014/072830, filed on Dec. 30, 2014.
Non-Final Office Action dated May 13, 2021, issued in connection with U.S. Appl. No. 16/933,025, filed Jul. 20, 2020, 33 pages.
Non-Final Office Action dated Apr. 20, 2021, issued in connection with U.S. Appl. No. 16/787,863, filed Feb. 11, 2020, 36 pages.
Notice of Allowance dated Jun. 23, 2021, issued in connection with U.S. Appl. No. 16/933,025, filed Jul. 20, 2020, 8 pages.

* cited by examiner

RETRIEVING AND PLAYING OUT MEDIA CONTENT FOR A PERSONALIZED PLAYLIST INCLUDING A CONTENT PLACEHOLDER

CROSS REFERENCES TO RELATED APPLICATIONS

This disclosure is a continuation of U.S. application Ser. No. 14/280,337, entitled "Retrieving and Playing Out Media Content for a Personalized Playlist Including a Content Placeholder," filed on May 16, 2014, which claims priority to U.S. Provisional Application No. 61/968,183, entitled "Retrieval and Playout of Media Content," filed on Mar. 20, 2014, each of which is hereby incorporated by reference herein.

USAGE AND TERMINOLOGY

In this disclosure, unless otherwise specified and/or unless the particular context clearly dictates otherwise, each usage of "a" or "an" means at least one, and each usage of "the" means the at least one.

TECHNICAL FIELD

This disclosure relates generally to computing devices, and more particularly, to computing devices configured for providing media content such as personalized news programs for instance.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, a method is disclosed. The method involves (i) receiving a playlist defining a sequence of media content items including a first media content item and a second media content item, and further defining a placeholder in between the first and second media content items; (ii) retrieving, from one or more server devices, first data representing the media content items of the received playlist, and using the retrieved first data to play out the media content items in accordance with the sequence defined by the playlist; (iii) making a first determination of whether the playlist defines a placeholder between the first and second media content items; (iv) responsive to the first determination being that the playlist defines a placeholder between the first and second content items, making a second determination of whether a condition has been satisfied, wherein the condition corresponds to a content category type; and (v) responsive to the second determination being that the condition has been satisfied, (a) retrieving second data representing a media content item of the content category type, and (b) using the retrieved second data to play out the media content item of the content category type in between playing out the first and second media content items.

In another aspect, a non-transitory computer-readable medium is disclosed. The medium has stored thereon program instructions that when executed by a processor cause performance of a set of functions. The set of functions include (i) receiving a playlist defining a sequence of media content items including a first media content item and a second media content item, and further defining a placeholder in between the first and second media content items; (ii) retrieving, from one or more server devices, first data representing the media content items of the received playlist, and using the retrieved first data to play out the media content items in accordance with the sequence defined by the playlist; (iii) making a first determination of whether the playlist defines a placeholder between the first and second media content items; (iv) responsive to the first determination being that the playlist defines a placeholder between the first and second content items, making a second determination of whether a has been satisfied, wherein the condition corresponds to a content category type; and (v) responsive to the second determination being that the condition has been satisfied, (a) retrieving second data representing a media content item of the content category type, and (b) using the retrieved second data to play out the media content item of the content category type in between playing out the first and second media content items.

In another aspect, a client device is disclosed. The client device includes a communication interface, a processor, and a non-transitory computer-readable medium having stored thereon program instructions that when executed by the processor cause the client device to perform a set of functions. The set of functions include (i) receiving a playlist defining a sequence of media content items including a first media content item and a second media content item, and further defining a placeholder in between the first and second media content items; (ii) retrieving, from one or more server devices, first data representing the media content items of the received playlist, and using the retrieved first data to play out the media content items in accordance with the sequence defined by the playlist; (iii) making a first determination of whether the playlist defines a placeholder between the first and second media content items; (iv) responsive to the first determination being that the playlist defines a placeholder between the first and second content items, making a second determination of a condition has been satisfied, wherein the condition corresponds to a content category type; and (v) responsive to the second determination being that the condition has been satisfied, (a) retrieving second data representing a media content item of the content category type, and (b) using the retrieved second data to play out the media content item of the content category type in between playing out the first and second media content items.

In another aspect, a method is disclosed. The method involves (i) accessing a playlist defining a sequence of media content items including a first media content item and a second media content item, and further defining a placeholder in between the first and second media content items; (ii) making a first determination of whether the playlist defines a placeholder between the first and second media content items; (iii) responsive to the first determination being that the playlist defines a placeholder between the first and second content items, making a second determination of whether a condition has been satisfied, wherein the condition corresponds to a content category type; and (iv) responsive to the second determination being that the condition has been satisfied, (a) retrieving data representing a media content item of the content category type, and (b) transmitting to a client device, the retrieved data representing the media content item of the content category type.

In another aspect, a non-transitory computer-readable medium is disclosed. The medium has stored thereon program instructions that when executed by a processor cause performance of a set of functions. The set of functions include (i) accessing a playlist defining a sequence of media content items including a first media content item and a second media content item, and further defining a placeholder in between the first and second media content items; (ii) making a first determination of whether the playlist defines a placeholder between the first and second media content items; (iii) responsive to the first determination being that the playlist defines a placeholder between the first and second content items, making a second determination of whether a condition has been satisfied, wherein the condition corresponds to a content category type; and (iv) responsive to the second determination being that the condition has been satisfied, (a) retrieving data representing a media content item of the content category type, and (b) transmitting to a client device, the retrieved data representing the media content item of the content category type.

In another aspect, a server device is disclosed. The server device includes a communication interface, a processor, and a non-transitory computer-readable medium having stored thereon program instructions that when executed by the processor cause the server device to perform a set of functions. The set of functions include (i) accessing a playlist defining a sequence of media content items including a first media content item and a second media content item, and further defining a placeholder in between the first and second media content items; (ii) making a first determination of whether the playlist defines a placeholder between the first and second media content items; (iii) responsive to the first determination being that the playlist defines a placeholder between the first and second content items, making a second determination of whether a condition has been satisfied, wherein the condition corresponds to a content category type; and (iv) responsive to the second determination being that the condition has been satisfied, (a) retrieving data representing a media content item of the content category type, and (b) transmitting, via the communication interface, to a client device, the retrieved data representing the media content item of the content category type.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
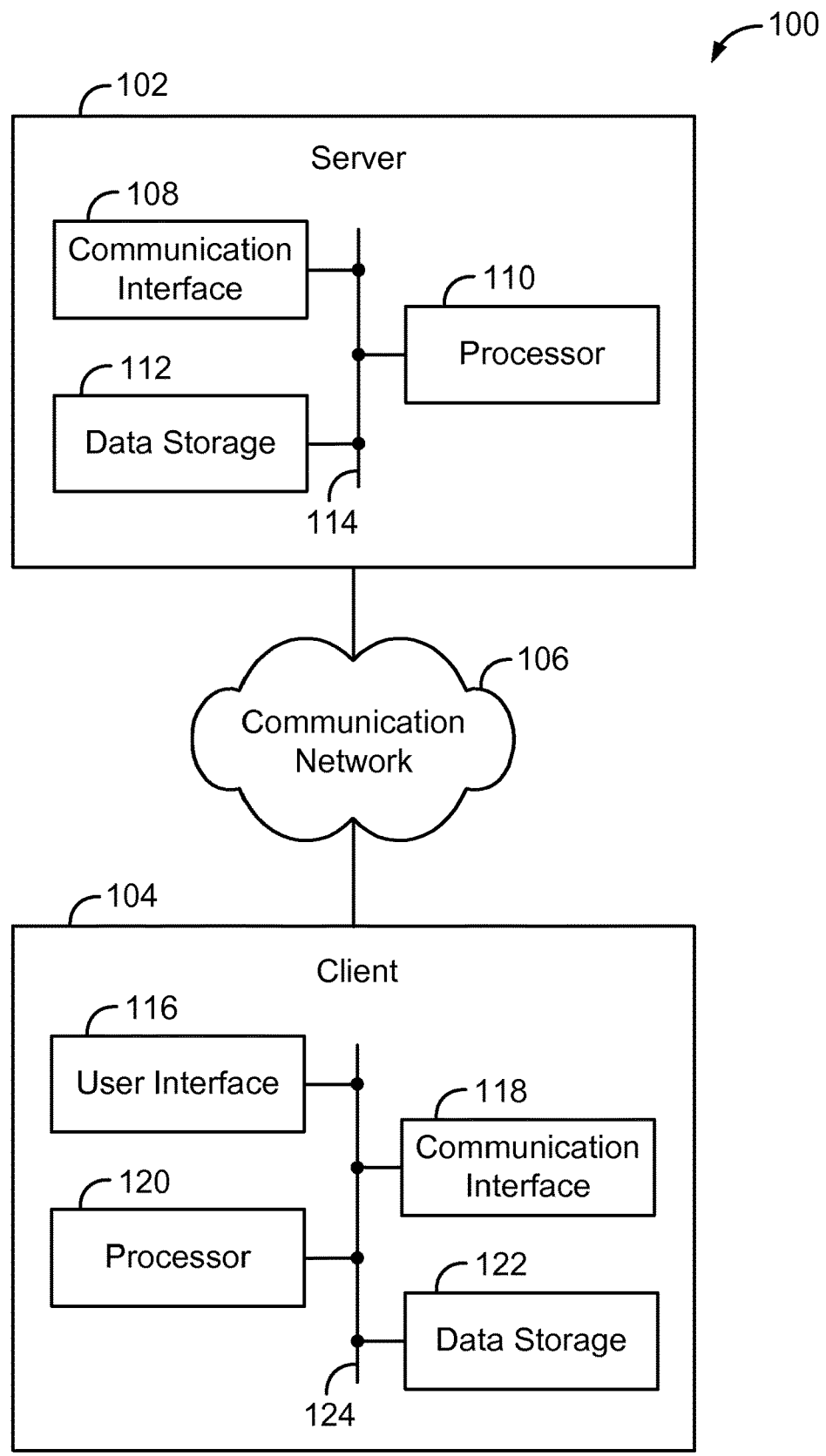
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one aspect, such a system may include at least two computing devices, such as a server and a client, and a communication network through which the server and the client may communicate.

In this system, the server and the client may perform a variety of functions. For example, the server may determine a set of attributes associated with a user of the client and may use the determined set of attributes as a basis to generate a playlist of a personalized news program for the user. The generated playlist defines a sequence of media content items, each of which may include audible content such as an audible version of a news story. An audible version of a news story may be referred to herein as an "audible news story." The generated playlist may also specify media content attribute data respectively for each media content item, including for instance a reference to data representing the media content item and metadata characterizing the media content item. Collectively, this sequence of media content items may thus define a personalized news program for playout to the user.

After or as the server generates this playlist, the server may transmit the playlist to the client, and the client may traverse the entries of the playlist, retrieve data representing each referenced media content item, and use the data to play out each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii)

responsive to the server receiving the transmitted request, the server may transmit to the client, the requested data, (iv) the client may receive the transmitted data, and (v) the client may use the received data to play out the represented media content item for the user.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream defining the requested media content item. As the client receives and buffers the requested data stream representing the media content items in sequence, the client may then play out the represented media content items to a user, thus providing the user with a substantially continuous playout of the media content items defining the personalized news program.

In accordance with the present disclosure, another way to help render a news program, or for that matter any sequence of media content items, more appealing to a user is for the client to, while playing out at least one media content item referenced by a playlist for the news program, retrieve data representing a particular media content item that is not referenced in the playlist, and for the client to use the retrieved data to play out the particular media content item by inserting it into the news program at a predetermined position as indicated by a placeholder defined by the playlist. This may allow the client to retrieve and playout time-sensitive media content (e.g., media content providing local weather conditions or local traffic conditions) while it still has a desired level of "freshness."

For instance, consider a playlist that defines a sequence of media content items including a first media content item and a second media content item, and that further defines a placeholder in between the first and second media content items. Note that throughout this disclosure, any use of a numerical modifier (e.g., "first" or "second") does not imply a sequential order unless explicitly indicated. While playing out the first media content item, the client may retrieve data representing a third media content item that provides local weather conditions. The client may then use the retrieved data to play out the third media content item in between playing out the first and second media content items.

By retrieving the data while playing out the first media content item, the client can minimize the amount of time between when the client receives the data and when the client plays out the third media content item for the user. This helps ensure that the local weather information is "fresh" for the user. In addition, by retrieving the data while the client plays out the first media content item, the client can retrieve the data in sufficient time before needing to playout the third media content item, thereby providing the client with sufficient time to process the retrieved data such that the client may timely play out the third media content item.

In some instances, the client may determine whether a condition is satisfied to determine a particular type of media content item that should be played out in connection with a placeholder as described above. For example, if the client determines that fifteen minutes have passed since the last time the client played out a media content item of a "weather" content category type, then the client may retrieve data representing another media content item of the same content category type. As another example, if the client determines that the current local time is between 5:00 pm and 8:00 pm, then the client may retrieve data representing a media content item of a "television listings" content category type (e.g., a media content item that provides local television listing information). In either case, the client may then use the retrieved data to playout the represented media content item.

In some instances, the client may use a priority scheme to select a content category type from among multiple content category types. For example, if the client determines that the two conditions recited above are satisfied, the client may use a priority list to determine that a content category type of "weather" has priority over a content category type of "television listings" in which case the client may retrieve data representing a content category type of "weather" rather than one of content category type "television listings." Other examples are possible as well.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions, such as those described in this disclosure (including the accompanying drawings). For example, the server 102 may be configured for establishing and transmitting to the client 104 a playlist defining a sequence of media content items that may define a personalized news program for instance, and for streaming data representing various media content items to the client 104 via the communication network 106 such that the client 104 may playout the represented media content items.

The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions, such as those described in this disclosure.

B. Client

Likewise, the client 104 may be configured for performing a variety of functions such as those described in this disclosure. For example, the client 104 may be configured for receiving from the server 102 a playlist defining a sequence of media content items to be played out by the client, traversing the entries of the playlist, retrieving the data representing each referenced media content item, and using the retrieved data to play out each referenced media content item in accordance with the sequence defined by the playlist.

The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, or a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions, such as those described in this disclosure. Such program instructions may define or be part of a discrete software application (e.g., a native app or web app) that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Methods of this disclosure will now be described principally in connection with providing a personalized news program to a user of the client 104. It will be understood, however, that this disclosure can extend to apply with respect to providing other types of media content as well, not necessarily limited to personalized news programs.

Figure 2:
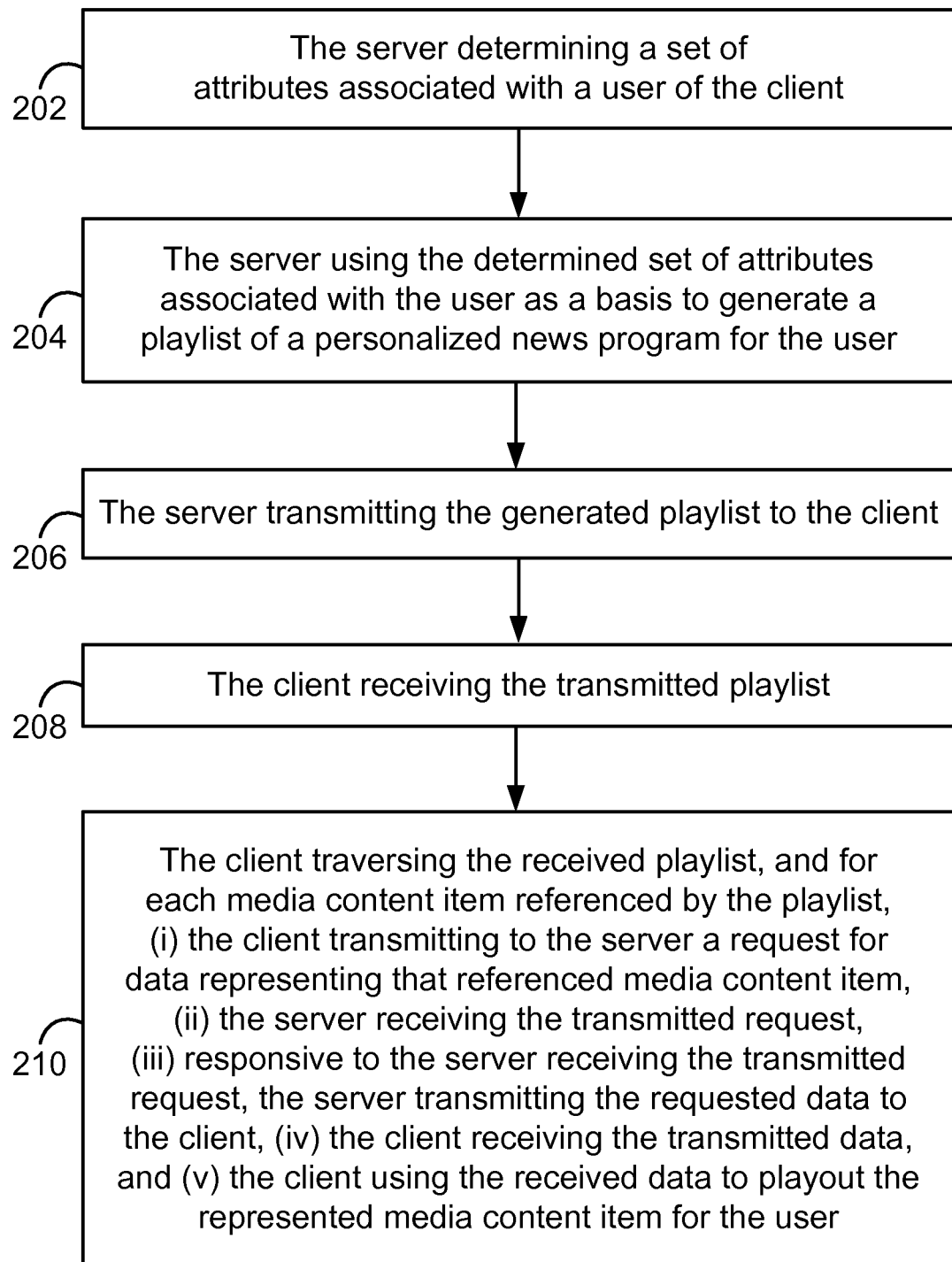
FIG. 2 is a flow chart depicting functions of an example method.

FIG. 2 is a flow chart depicting functions that can be carried out in an example method for providing a user of the client 104 with a personalized news program. At block 202, the example method involves the server 102 determining a set of (i.e., one or more) attributes associated with a user of the client 104. At block 204, the method then involves the server 102 using the determined set of attributes as a basis to generate a playlist of a personalized news program for the user. At block 206, the method then involves the server 102 transmitting the generated playlist to the client 104, and at block 208, the method involves the client 104 receiving the transmitted playlist. At block 210, the method then involves the client 104 traversing the received playlist, and for each media content item referenced by the playlist, (i) the client transmitting to the server a request for data representing that referenced media content item, (ii) the server receiving the transmitted request, (iii) responsive to the server receiving the transmitted request, the server transmitting the requested data to the client, (iv) the client receiving the transmitted data, and (v) the client using the received data to play out the represented media content item for the user.

In this process, each user-associated attribute that the server 102 determines may take various forms. By way of example, each attribute may relate to one or more of the following: the user's extent of interest in a particular type of news story, the user's interest in a particular type of audible news story, whether the user has a subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the function of the server 102 determining the set of attributes associated with the user may take various forms. In one example implementation, for instance, the server 102 may receive from the client 104 an identification of the user of the client 104, and the server 102 may then refer to one or more data sources that correlate or facilitate correlation of that identification with an attribute, so as to determine an attribute associated with the user.

In another example implementation, the client 104 may determine a user-associated attribute and may report the determined attribute to the server 102, in which case the server would determine the user-associated attribute by receiving the reported attribute from the client 104. To facilitate this, the client 104 may provide a configuration interface through which the user can manually enter or select a user-associated attribute, and the client 104 may thus determine the user-associated attribute by receiving user indications of the user-associated attribute through that interface. Alternatively or additionally, the client 104 may determine a user-associated attribute by evaluating information associated with the user, such as user profile records, browsing history, shopping history, location history, and the like. Other examples are possible as well.

For this purpose, the client 104 may determine the attribute associated with the user in a variety of ways. As one example, the client 104 may receive the attribute as input from the user. As another example, the client 104 may receive other input from the user, and the client 104 may use the input as a basis to determine the attribute. For instance, the client 104 may receive input from the user, such as the user's destined location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined set of attributes associated with the user in various ways to generate the playlist of the personalized news program for the user. For instance, based on the set of user-associated attributes, the server 102 may select particular audible news stories or types of audible news stories to specify as media content items in the playlist. As such, the server 102 may be configured with data that maps particular sets of user-associated attributes with particular types of audible news stories, possibly giving more weight to inclusion of certain types of audible news stories than to other types of audible news stories. For example, the data may indicate that a particular set of user-associated attributes suggests more likely user interest in entertainment news than in politics news, in which case the server 102 may structure the playlist to specify a greater extent of entertainment-related audible news stories than politics-related audible news stories. As another example, the data may indicate that a particular set of user-associated attributes suggests great user interest in sports, in which case the server 102 may structure the playlist to specify a relatively great extent of sports-related audible news stories.

In some examples, an audible news story's type may be defined by a set of attributes associated with the audible news story, examples of which may include or relate to one or more of the following: the audible news story's content category, the audible news story's target demographic (e.g., by age, gender, or location), the audible news story's creation date, the audible news story's author or other attribution information, the extent of popularity of the audible news story, the extent of popularity of a person or topic related to the audible news story, or the manner in which data representing the audible news story was generated.

These attributes may be stored in a variety of ways. For example, they may be stored as metadata along with the data representing the audible news story to which they correspond. These attributes may also be set in a variety of different ways, such as by a user via a user interface.

As indicated above, a media content item such as an audible news story may be represented by data. This data may be generated in a variety of ways. For example, the server 102 may generate data representing an audible news story by recording a narrator reading aloud a text-based version of the news story, or by using a well-known TTS software and/or hardware system to convert data representing a text-based version of a news story into data representing an audible version of the news story. Further, data representing a media content item may be stored in a variety of ways. For example, the data may be stored in the form of a digital audio file in a data storage, such as the data storage 112.

In one implementation, the function of the server 102 using the determined set of attributes associated with the user as a basis to generate a playlist of a personalized news program for the user may involve the server 102 (i) using the determined set of attributes associated with the user as a basis to select a playlist template from a group of templates (e.g., stored in the data storage 112), (ii) using the selected playlist template as a basis to select a set of audible news stories from a group of audible news stories (e.g., stored in the data storage 112), and (iii) generating a playlist that includes references to each audible news story from the selected set of audible news stories.

Generally, a playlist template serves as an outline for a playlist and may define a sequence of placeholders for media content attribute data. For each of these placeholders, the playlist template may further specify placeholder attribute data. Based on this placeholder attribute data, the server 102 may select a set of audible news stories, and replace that placeholder with media content attribute data for the selected set of audible news stories, thereby converting the playlist template into a playlist.

There may be a variety of different types of placeholder attribute data, examples of which may include a quantity tag and a type tag. A quantity tag specifies a quantity of audible news stories that the server 102 should select for the corresponding placeholder. And the type tag specifies the particular types of audible news stories that the server 102 should select for the corresponding placeholder.

In line with the discussion above, the playlist that the server 102 generates may define an ordered sequence of entries, each of which provides media content attribute data regarding a respective media content item, such as a particular audible news story. In practice, the playlist may provide this information in various ways, such as with use of extensible markup language (XML) for instance, in a manner that the client 104 would be configured to read.

For a given media content item, the media content attribute data may include a reference to the data representing the media content item, such as a network address or content identifier that the client 104 can read and use as a basis to request and receive the data representing the media content item for playout of the represented media content item. Thus, the client 104 may read the reference indicated for a given media content item to determine a network address or the like from which to obtain the data representing the media content item, and the client 104 may request and receive the data representing the media content item from that network address or by otherwise using the indicated reference.

Such a reference may have various levels of granularity. By way of example, the reference may be specific to data representing a particular audible news story, by specifying a particular story identifier or name of a news story media file for instance, in which case the client 104 could request the server 102 to transmit that data representing that particular audible news story and the server 102 could retrieve that data representing that particular audible news story from data storage and transmit it to the client 104. And as another example, the reference may be more general, specifying a class of news story, such as "sports" or "politics" for instance, in which case the client 104 could request the server 102 to transmit data representing an audible news story of that class generally, and the server 102 may then retrieve data representing a latest or most pertinent audible news story of that class and transmit it to the client 104. Further, any or all of these references may refer to locations other than server 102, such as to one or more other servers for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each media content item of the sequence, (i) the client transmitting to the server, a request for data representing the media content item, (ii) the server receiving the transmitted request, (iii) responsive to the server receiving the transmitted request, the server transmitting to the client, the requested data, (iv) the client receiving the transmitted data, and (v) the client using the received data to playout the represented media content item for the user.

As further noted above, this process may involve streaming of the data representing the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream the data representing that media content item to the client 104. To facilitate this, the client 104 may engage in signaling with the server 102 in accordance with the Real Time Streaming Protocol (RTSP), to establish a streaming media session and to specify the data representing the media content to be streamed, and the server 102 may stream the requested data to the client 104 in accordance with the Real-time Transport Protocol (RTP). As the client 104 receives this streamed data, the client 104 may then buffer and play out the content represented by the data in real time, providing the user with substantially continuous playout of the news program.

Figure 3:
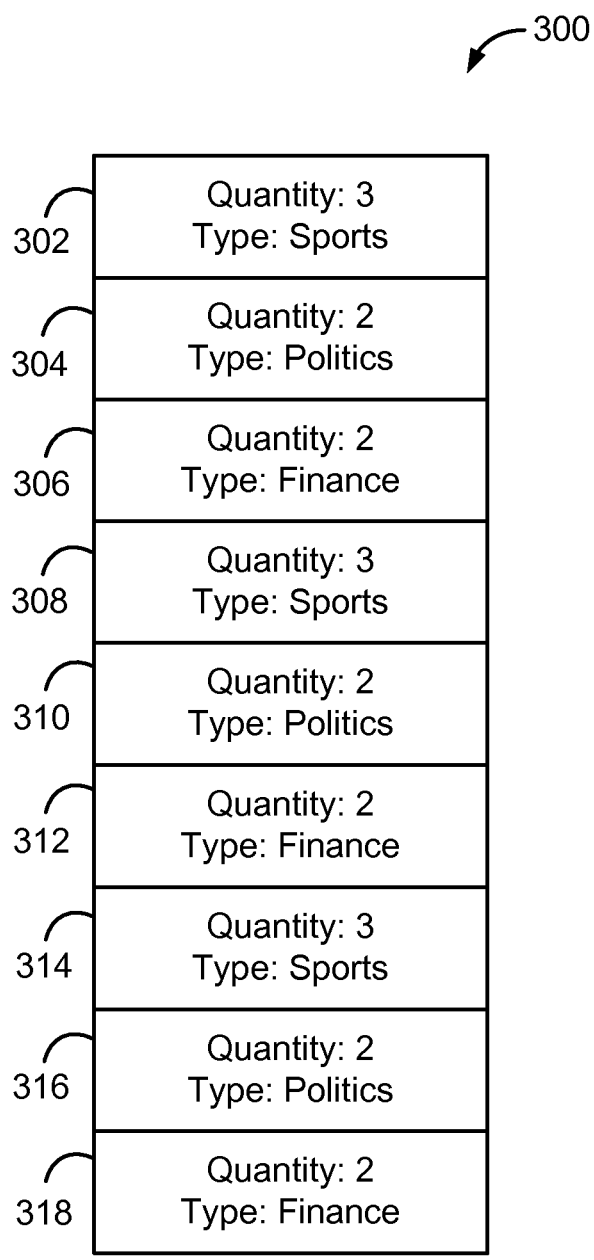
FIG. 3 is a diagram of an example playlist template.

To help appreciate operation of this process, FIG. 3 shows an example playlist template 300. The template 300 includes nine ordered entries 302-318 (even numbers only). Each of the entries 302-318 serves as a placeholder for media content attribute data. And each of those entries includes placeholder attribute data, namely a quantity tag and a type tag. For example, the entry 302 includes a quantity tag that specifies "3" and a type tag that specifies a "Sports" content category type. As another example, the entry 304 includes a quantity tag that specifies "2" and a type tag that specifies a "Politics" content category type.

As indicated above, at block 204, the method may involve the server 102 using the selected playlist template as a basis to select a set of audible news stories from a group of audible news stories (e.g., stored in the data storage 112). This may involve, for each entry that serves as a placeholder of media content attribute data, the server 102 using the quantity and type tags of that entry as a basis to select a set of audible news stories. For example, for the entry 302, the server 102 may select a set of three audible news stories that are all associated with a "sports" content category attribute. As another example, for the entry 304, the server 102 may select a set of two audible news stories that are all associated with a "politics" content category attribute.

Additionally or alternatively, the server 102 may determine an attribute associated with an audible news story, and the server 102 may use the determined attribute as a basis to select the set of audible news stories from the group of audible news stories.

As noted above, block 204 may involve generating a playlist that includes references to each audible news story from the selected set of audible news stories. This may involve the server 102 replacing placeholders of the playlist template with data representing the corresponding selected sets of audible news stories, and thereby generating a playlist by "converting" the playlist template into a playlist.

Figure 4:
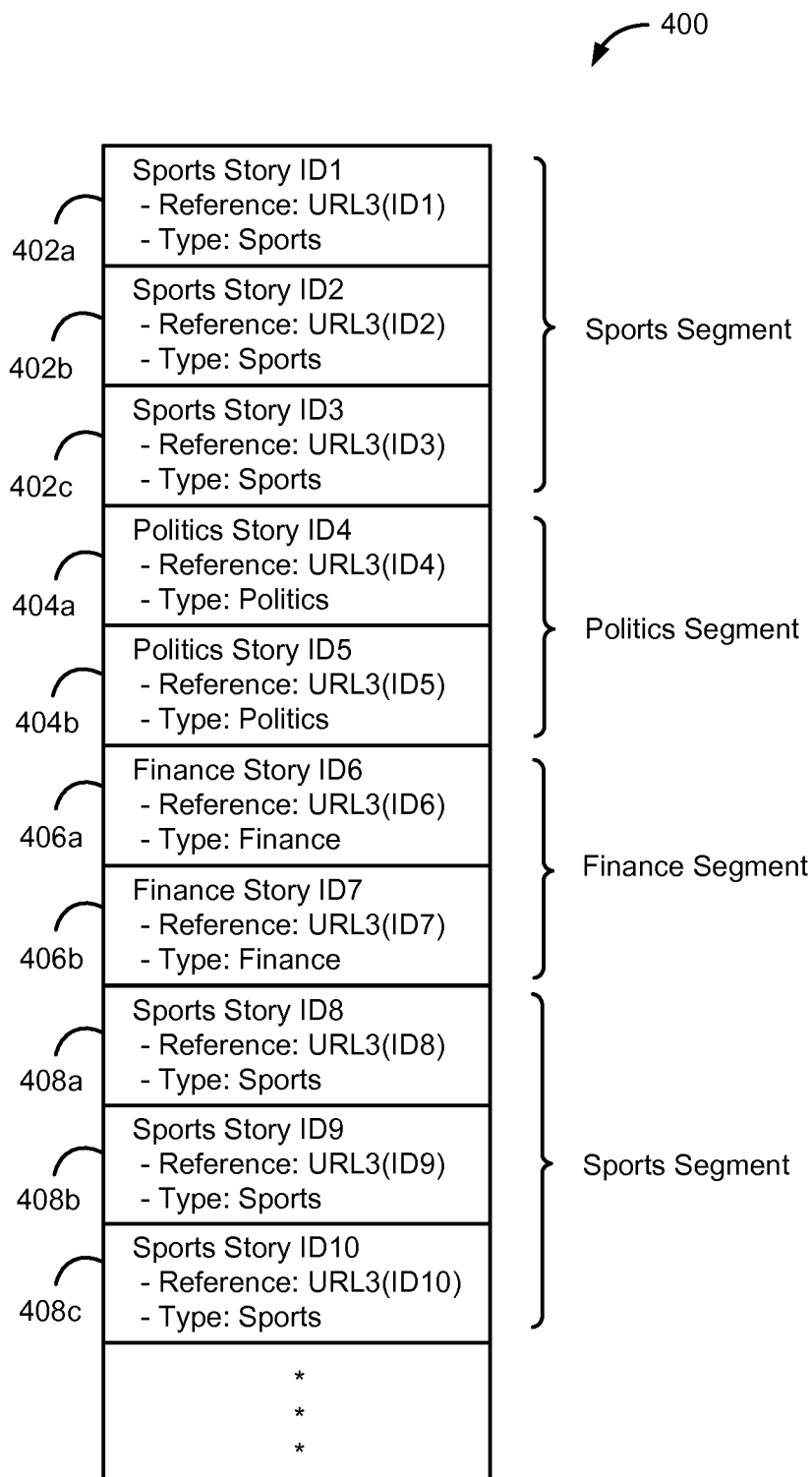
FIG. 4 is a diagram of an example playlist.

FIG. 4 shows a portion of an example playlist 400 that the server 102 may generate after the server 102 selects the playlist template 300. As shown, the generated playlist 400 include entries 402a-c, 404a-b, 406a-b, and 408a-c, each of which is for a respective audible news story and designates a respective reference and content category type. For example, entry 402a designates a "Sports Story ID1," with a reference in the form of "URL3" that may point to the server 102 and that designates "ID1" as a query parameter or the like, and with a content category type indication of "Sports." Entry 402b then designates a "Sports Story ID2," with a reference in the form of "URL3" that may point to the server 102 and that designates "ID2" as a query parameter, and with a content category type indication of "Sports." And entry 402c designates a "Sports Story ID3," with a reference in the form of "URL3" that may point to the server 102 and that designates "ID3" as a query parameter, and with a content category type indication of "Sports." As shown, this portion of the playlist 400 may be referred to as the "Sports Segment."

As another example, entry 404a designates a "Politics Story ID4," with a reference in the form of "URL3" that may point to the server 102 and that designates "ID4" as a query parameter, and with a content category type indication of "Politics." And entry 404b designates a "Politics Story ID5," with a reference in the form of "URL3" that may point to the server 102 and that designates "ID5" as a query parameter, and with a content category type indication of "Politics." As shown, this portion of the playlist 400 may be referred to as the "Politics Segment."

For brevity, FIG. 4 does not show additional entries after 408c, but it should be apparent that the server 102 may generate the remainder of the playlist 400 using the techniques described above.

Figure 5:
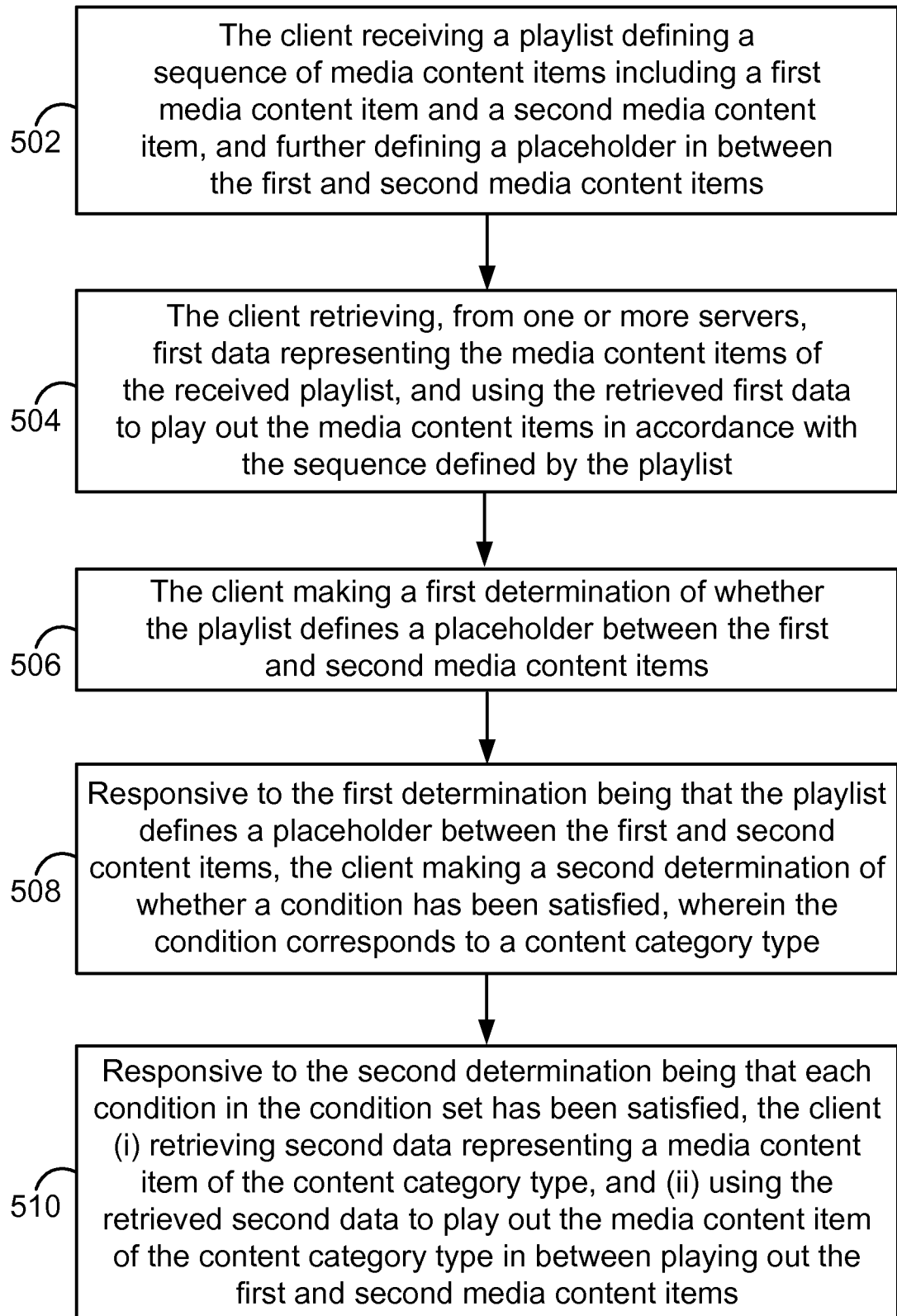
FIG. 5 is a flow chart depicting functions of another example method.

In some instances, a playlist may further define placeholders (having positions within the defined sequence) that may be detected and used as signals by the client 104 to perform certain actions. FIG. 5 is a flow chart depicting functions that can be carried out in an example method related to this feature.

At block 502, the method involves the client 104 receiving a playlist defining a sequence of media content items including a first media content item and a second media content item, and further defining a placeholder in between the first and second media content items. The playlist may define placeholders of this type on a variety of ways. For instance, the playlist may include a list of such placeholders, with each being identified by its position within the sequence (e.g., between two particular media content items in the sequence). In one example, the playlist template, and therefore the corresponding playlist, may indicate the positions of such placeholders.

At block 504, the method involves the client 104 retrieving, from one or more servers, first data representing the media content items of the received playlist, and using the retrieved first data to play out the media content items in accordance with the sequence defined by the playlist. This may involve the client 104 performing one or more of the functions described above in connection with the function at block 206 such that the client 104 may receive and play out the media content items referenced by the received playlist At block 506, the method involves the client 104 making a first determination of whether the playlist defines a placeholder between the first and second media content items. This may involve the client 104 analyzing a list of placeholders as described above.

At block 508, the method involves responsive to the first determination being that the playlist defines a placeholder between the first and second content items, the client 104 making a second determination of whether a condition has been satisfied, wherein the condition corresponds to a content category type.

The condition may take a variety of forms and may be a complex condition that includes multiple sub-conditions. For example, a condition A may be that both condition B and condition C are satisfied. As another example, a condition D may be that either condition E or condition F is satisfied. Other examples are possible as well.

In one example, a condition (or sub-condition) may be that the placeholder is in a particular position with respect to the sequence defined by the playlist. As another example, a condition may be that a threshold duration has passed since another media content item of the content category type has been played out in connection with a placeholder in between media content items of the playlist. As yet another example, a condition may be that a threshold number of media content items of the content category type have been played out in connection with a placeholder in between media content items of the playlist. As yet another example, a condition may be that a particular time is within a particular time period range. As yet another example, a condition may be that data representing a media content item of the corresponding content category type is available for retrieval.

As noted above, each condition may correspond with a content category type. Examples of these content category types include "breaking news," "advertisements," "traffic," "weather," "sports," "finance," "horoscopes," "television listings," "health tips," and "movie reviews." Some example conditions that may correspond to content category types will now be described.

Where a condition corresponds to a "breaking news" content category type, the condition may be that data representing a media content item of the "breaking news" content category type is available for retrieval (e.g., from the server 104). In some instances, the server 104 may selectively make such data available (e.g., for a limited duration after the breaking news story first "breaks").

Where a condition corresponds to an "advertisements" content category type, the condition may be that (i) the placeholder is positioned immediately after a sequentially second media content item in the sequence, or (ii) at least ten minutes have passed since a media content item of the "advertisements" content category type has been played out in connection with a placeholder in between media content items of the playlist.

Where a condition corresponds to a "traffic" content category type, the condition may be that (i) the placeholder is positioned immediately after a sequentially first media content item in the sequence, or (ii) at least ten minutes have passed since a media content item of the "traffic" content category type has been played out in connection with a placeholder in between media content items of the playlist. As example of a media content item of this type may be a media content item that provides local traffic information.

Where a condition corresponds to a "weather" content category type, the condition may be that (i) the placeholder is positioned immediately after a sequentially first media content item in the sequence, or (ii) (a) at least fifteen minutes have passed since a media content item of content category type "weather" has been played out in connection with a placeholder in between media content items of the playlist, and (b) less than two media content items of the "weather" content category type have been played out in connection with a placeholder in between media content items of the playlist. As example of a media content item of this type may be a media content item that provides local weather information.

Where a condition corresponds to a "sports" content category type, the condition may be that (i) at least fifteen minutes have passed since a media content item of content category type "sports" has been played out in connection with a placeholder in between media content items of the playlist, and (ii) less than two media content items of the "sports" content category type have been played out in connection with a placeholder in between media content items of the playlist. As example of a media content item of this type may be a media content item that provides sports scores such as for games that are currently being played or for games that were played during a particular time period (e.g., during the last day). As another example, a media content item of this type may provide sports-related schedules, such as a schedule of games during a particular time period (e.g., games scheduled during the rest of the day).

Where a condition corresponds to a "finance" content category type, the condition may be that (i) no media content items of the "finance" content category type have been played out in connection with a placeholder in between media content items of the playlist. As example of a media content item of this type may be a media content that provides stock or financial market information.

Where a condition corresponds to a "horoscopes" content category type, the condition may be that (i) no media content items of the "horoscopes" content category type have been played out in connection with a placeholder in between media content items of the playlist, and (ii) a current time is between 5:00 am and 9:00 am. As example of a media content item of this type may be a media content item that provides a horoscope based on a user's birthday.

Where a condition corresponds to a "television listings" content category type, the condition may be that (i) no media content items of the "television listings" content category type have been played out in connection with a placeholder in between media content items of the playlist, and (ii) a current time is between 5:00 pm and 8:00 pm. As example of a media content item of this type may be a media content item that provides local television listings.

Where a condition corresponds to a "health tips" content category type, the condition may be that no media content items of the "health tips" content category type have been played out in connection with a placeholder in between media content items of the playlist. As example of a media content of this type may be media content that provides health-related tips.

Where a condition corresponds to a "movie reviews" content category type, the condition may be that (i) no media content items of the "movie reviews" content category type have been played out in connection with a placeholder in between media content items of the playlist, and (ii) a current time is between 5:00 pm and 8:00 pm, Thursday through Sunday. As example of a media content item of this type may be a media content item that provides movie reviews.

In some instances, the client may use a priority scheme to select a content category type from among multiple content category types. For example, if the client 104 determines that two or more of the conditions recited above are satisfied, the client may use a priority list to determine that a first content category type has priority over a second content category type, in which case the client 104 may retrieve data representing the first content category type rather than one of the second content category type. In one example, the example content category types may be prioritized in the order in which they are recited above. Other examples are also possible.

Also, the client 104 may use mapping data that maps a particular content category type to media content attribute data for the corresponding media content item. This may allow the client 104 to use media content attribute data (e.g., indicating a server that provides such data) to retrieve data representing a given media content item.

At block 510, the method involves responsive to the second determination being that each condition in the condition set has been satisfied, the client 104 (i) retrieving second data representing a media content item of the content category type, and (ii) using the retrieved second data to play out the media content item of the content category type in between playing out the first and second media content items. Notably, the example method described above may be performed in connection with each placeholder of the playlist.

In some instances, the client 104 making the second determination may involve the client making the second determination while at least one of the retrieved media content items is being played out (e.g., while the first media content item is being played out). Further, in some instances, the client 104 retrieving second data representing the media content item of the content category type may involve the client 104 retrieving second data representing the media content item of the content category type while at least one of the media content items represented by the retrieved first data is being played out. This may allow the client to retrieve and playout time-sensitive media while it still has a desired level of "freshness."

Figure 6:
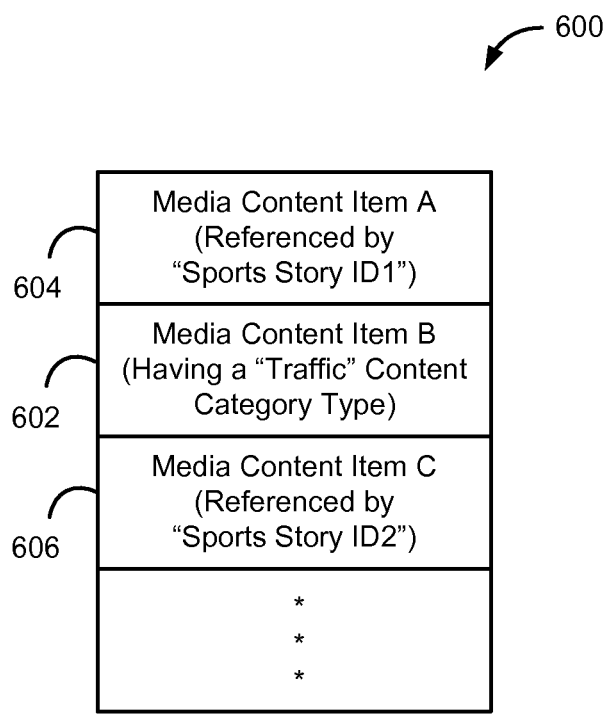
FIG. 6 is a diagram of an example news program.

FIG. 6 helps illustrate the result of the client 104 inserting a media content item into a news program 600 based on the playlist 400 as discussed above. In particular, FIG. 6 illustrates an example in which the client 104 inserts a media content item A 602 (having a "traffic" content category type) in between a media content item B 604 (referenced by "Sport Story ID1") and media content item C 604 (referenced by "Sports Story ID2" 606).

Figure 7:
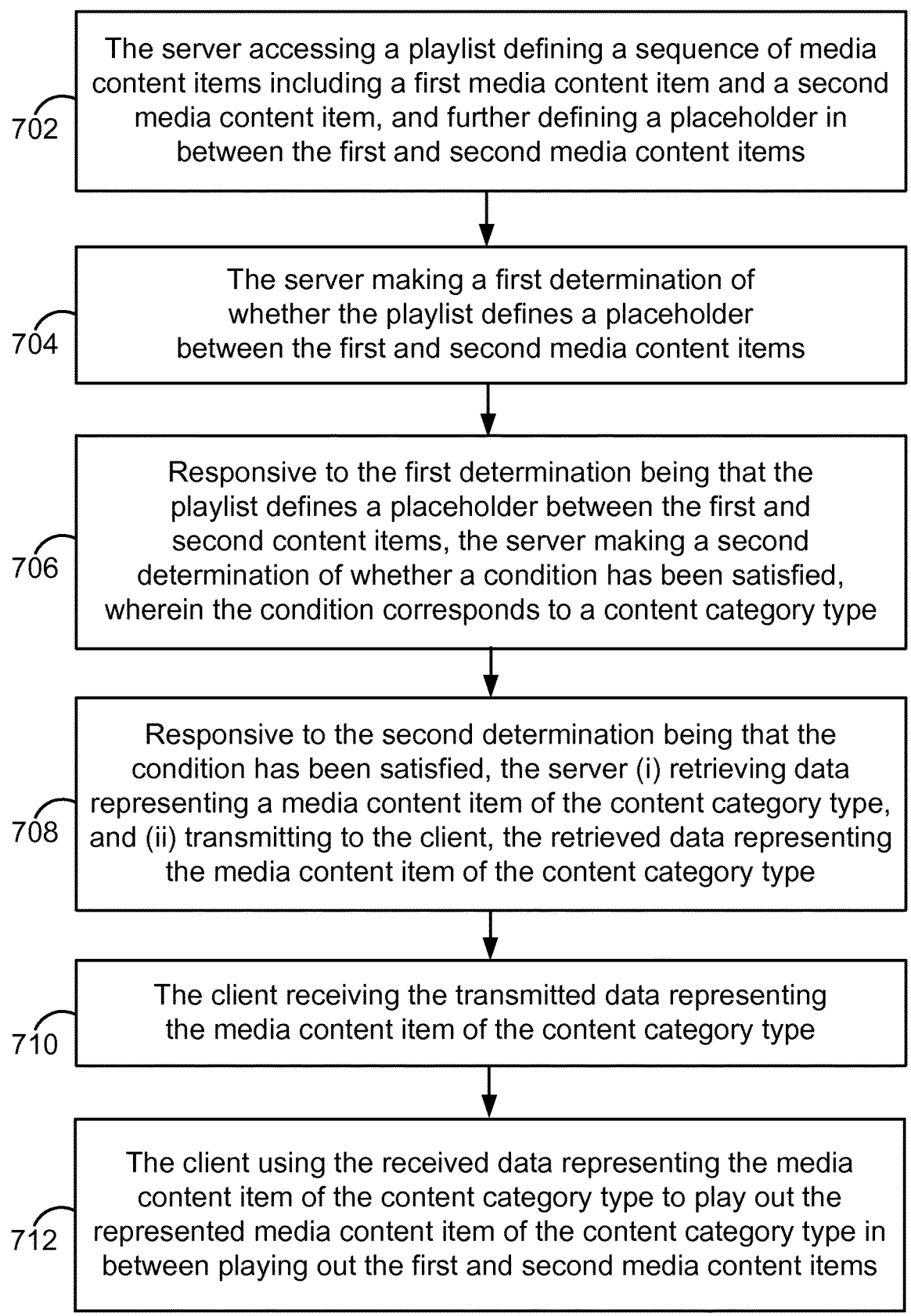
FIG. 7 is a flow chart depicting functions of another example method.

FIG. 7 is a flow chart depicting functions that can be carried out in another example method. At block 702, the method involves the server 102 accessing a playlist defining a sequence of media content items including a first media content item and a second media content item, and further defining a placeholder in between the first and second media content items. The server 102 may access the playlist from the data storage 112, for example.

At block 704, the method involves the server 102 making a first determination of whether the playlist defines a placeholder between the first and second media content items.

At block 706, the method involves responsive to the first determination being that the playlist defines a placeholder between the first and second content items, the server 102 making a second determination of whether a condition has been satisfied, wherein the condition corresponds to a content category type.

At block 708, the method involves responsive to the second determination being that the condition has been satisfied, the server 102 (i) retrieving data representing a media content item of the content category type, and (ii) transmitting to the client 104, the retrieved data representing the media content item of the content category type.

At block 710, the method involves the client 104 receiving the transmitted data representing the media content item of the content category type.

At block 712, the method involves the client 104 using the received data representing the media content item of the content category type to play out the represented media content item of the content category type in between playing out the first and second media content items.

IV. Example Variations

The variations described in connection with select examples of the disclosed system and method may be applied to all other examples of the disclosed system and method.

Further, while one or more functions have been described as being performed by or otherwise related to certain devices or entities (e.g., the server 102 or the client 104), the functions may be performed by or otherwise related to any device or entity. As such, any function that has been described as being performed by the server 102 could alternatively be performed by a different server or by the client 104. For instance, in one example, a one server could generate and transmit a playlist to a client, and based on the playlist data of the playlist, the client could request and receive different portions of audible content from multiple other servers.

Further, the functions need not be performed in the disclosed order, although in some examples, an order may be preferred. Further, in some instances, select functions may be performed contemporaneously or simultaneously. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method comprising:
  receiving, by a client device, a playlist defining a sequence of media content items including a first media content item and a second media content item, and further defining a placeholder in between the first and second media content items;
  retrieving, by the client device, from one or more server devices, first data representing the media content items of the received playlist, and using the retrieved first data to play out the media content items; and
  while playing out at least one of the media content items represented by the retrieved first data:
    making, by the client device, a first determination of whether the playlist defines a placeholder between the first and second media content items;
    responsive to the first determination being that the playlist defines a placeholder between the first and second content items, making, by the client device, a second determination of whether a condition has been satisfied, wherein the condition comprises a condition that a content category type has a particular relationship with at least one of the media content items that has been played out, wherein the particular relationship is at least that a threshold duration has passed since the client device has placed out another media content item of the content category type, and wherein the content category type is one of a plurality of different predetermined content category types; and responsive to the second determination being that the condition has been satisfied, (i) retrieving, by the client device, from the one or more server devices, second data representing a media content item that has the content category type and that is not specified in the accessed playlist, and (ii) using, by the client device, the retrieved second data to play out the media content item of the content category type in between playing out the first and second media content items.

2. The method of claim 1, wherein making the second determination comprises making the second determination after at least one of the media content items represented by the retrieved first data has been played out, and wherein retrieving second data representing the media content item of the content category type comprises retrieving second data representing the media content item of the content category type after at least one of the media content items represented by the retrieved first data has been played out.

3. The method of claim 2, wherein making the second determination comprises making the second determination while the first media content item is being played out, and wherein retrieving second data representing the media content item of the content category type comprises retrieving second data representing the media content item of the content category type while the first media content item is being played out.

4. The method of claim 1, wherein the condition comprises a condition that the placeholder is in a particular position with respect to the sequence defined by the playlist.

5. The method of claim 1, wherein the particular relationship is further that the client device has played out a threshold number of media content items of the content category type.

6. A non-transitory computer-readable medium having stored thereon program instructions that when executed by a processor cause performance of a set of functions, the set of functions comprising:

receiving a playlist defining a sequence of media content items including a first media content item and a second media content item, and further defining a placeholder in between the first and second media content items;

retrieving, from one or more server devices, first data representing the media content items of the received playlist, and using the retrieved first data to play out the media content items; and while playing out at least one of the media content items represented by the retrieved first data:

making a first determination of whether the playlist defines a placeholder between the first and second media content items;

responsive to the first determination being that the playlist defines a placeholder between the first and second content items, making a second determination of whether a condition has been satisfied, wherein the condition comprises a condition that a content category type has a particular relationship with at least one of the media content items that has been played out, wherein the particular relationship is at least that a threshold duration has passed since the client device has placed our another media content item of the content category type, and wherein the content category type is one of a plurality of different predetermined content category types; and responsive to the second determination being that the condition has been satisfied, (i) retrieving, from the one or more server devices, second data representing a media content item that has the content category type and that is not specified in the accessed playlist, and (ii) using the retrieved second data to play out the media content item of the content category type in between playing out the first and second media content items.

7. The computer-readable medium of claim 6, wherein the condition comprises a condition that the placeholder is in a particular position with respect to the sequence defined by the playlist.

8. The computer-readable medium of claim 6, wherein the particular relationship is further that a threshold number of media content items of the content category type has been played out.

9. A client computing device comprising:

a processor; and a non-transitory computer-readable medium having stored thereon program instructions that, when executed by the processor, cause the client computing device to perform a set of operations comprising:

receiving a playlist defining a sequence of media content items including a first media content item and a second media content item, and further defining a placeholder in between the first and second media content items;

retrieving, from one or more server devices, first data representing the media content items of the received playlist, and using the retrieved first data to play out the media content items; and while playing out at least one of the media content items represented by the retrieved first data:

making a first determination of whether the playlist defines a placeholder between the first and second media content items;

responsive to the first determination being that the playlist defines a placeholder between the first and second content items, making a second determination of whether a condition has been satisfied, wherein the condition comprises a condition that a content category type has a particular relationship with at least one of the media content items that has been played out, wherein the particular relationship is at least that a threshold duration has passed since the client device has played out another media content item of the content category type, and wherein the content category type is one of a plurality of different predetermined content category types; and responsive to the second determination being that the condition has been satisfied, (i) retrieving, from the one or more server devices, second data representing a media content item that has the content category type and that is not specified in the accessed playlist, and (ii) using the retrieved second data to play out the media content item of the content category type in between playing out the first and second media content items.

10. The client computing device of claim 9, wherein the condition comprises a condition that the placeholder is in a particular position with respect to the sequence defined by the playlist.

11. The client computing device of claim 9, wherein the particular relationship is further that the client computing device has played out a threshold number of media content items of the content category type.

12. A method comprising:
accessing, by a computing device, a playlist defining a sequence of media content items including a first media content item and a second media content item, and further defining a placeholder in between the first and second media content items; and
while a client device is playing out at least one of the media content items:
making, by the computing device, a first determination of whether the playlist defines a placeholder between the first and second media content items;
responsive to the first determination being that the playlist defines a placeholder between the first and second content items, making, by the computing device, a second determination of whether a condition has been satisfied, wherein the condition comprises a condition that a content category type has a particular relationship with at least one of the media content items that has been played out, wherein the particular relationship is at least that a threshold duration has passed since the client device has played out another media content item of the content category type, and wherein the content category type is one of a plurality of different predetermined content category types; and
responsive to the second determination being that the condition has been satisfied, (i) retrieving, by the computing device, data representing a media content item that has the content category type and that is not specified in the accessed playlist, and (ii) transmitting, by the computing device, to the client device, the retrieved data representing the media content item of the content category type.

13. The method of claim 12, wherein the condition comprises a condition that the placeholder is in a particular position with respect to the sequence defined by the playlist.

14. The method of claim 12, wherein the particular relationship is further that the client device has played out a threshold number of media content items of the content category type.

15. The method of claim 12, further comprising:
before accessing the playlist:
determining a set of attributes associated with a user of the client device; and
generating the playlist based on the determined set of attributes.

16. A non-transitory computer-readable medium having stored thereon program instructions that when executed by a processor cause performance of a set of functions, the set of functions comprising:
accessing a playlist defining a sequence of media content items including a first media content item and a second media content item, and further defining a placeholder in between the first and second media content items; and
while playing out at least one of the media content items:
making a first determination of whether the playlist defines a placeholder between the first and second media content items;
responsive to the first determination being that the playlist defines a placeholder between the first and second content items, making a second determination of whether a condition has been satisfied, wherein the condition comprises a condition that a content category type has a particular relationship with at least one of the media content items that has been played out, wherein the particular relationship is at least that a threshold duration has passed since the client device has played out another media content item of the content category type, and wherein the content category type is one of a plurality of different predetermined content category types; and
responsive to the second determination being that the condition has been satisfied, (i) retrieving data representing a media content item that has the content category type and that is not specified in the accessed playlist, and (ii) transmitting to a client device, the retrieved data representing the media content item of the content category type.

17. The computer-readable medium of claim 16, wherein the condition comprises a condition that the placeholder is in a particular position with respect to the sequence defined by the playlist.

18. The non-transitory computer-readable medium of claim 16, the set of functions further comprising:
before accessing the playlist:
determining a set of attributes associated with a user of the client device; and
generating the playlist based on the determined set of attributes.

19. A server computing device comprising:
a processor; and
a non-transitory computer-readable medium having stored thereon program instructions that, when executed by the processor, cause the server computing device to perform a set of operations comprising:
accessing a playlist defining a sequence of media content items including a first media content item and a second media content item, and further defining a placeholder in between the first and second media content items; and
while playing out at least one of the media content items:
making a first determination of whether the playlist defines a placeholder between the first and second media content items;
responsive to the first determination being that the playlist defines a placeholder between the first and second content items, making a second determination of whether a condition has been satisfied, wherein the condition comprises a condition that a content category type has a particular relationship with at least one of the media content items that has been played out, wherein the particular relationship is at least that a threshold duration has passed since the client device has played out another media content item of the content category type, and wherein the content category type is one of a plurality of different predetermined content category types; and
responsive to the second determination being that the condition has been satisfied, (i) retrieving data representing a media content item that has the content category type and that is not specified in the accessed playlist, and (ii) transmitting to a client device, the retrieved data representing the media content item of the content category type.

20. The server computing device of claim 19, wherein the particular relationship is further that the client device has played out a threshold number of media content items of the content category type.

* * * * *